C. S. CLARK.
REVERSING GEAR FOR ENGINES.
APPLICATION FILED APR. 1, 1914.

1,117,325.

Patented Nov. 17, 1914.
2 SHEETS—SHEET 1.

Witnesses
Robert M. Sutphen
A. L. Hurd

Inventor
C. S. CLARK

By Watson E. Coleman
Attorney

C. S. CLARK.
REVERSING GEAR FOR ENGINES.
APPLICATION FILED APR. 1, 1914.
1,117,325.
Patented Nov. 17, 1914.
2 SHEETS—SHEET 2.
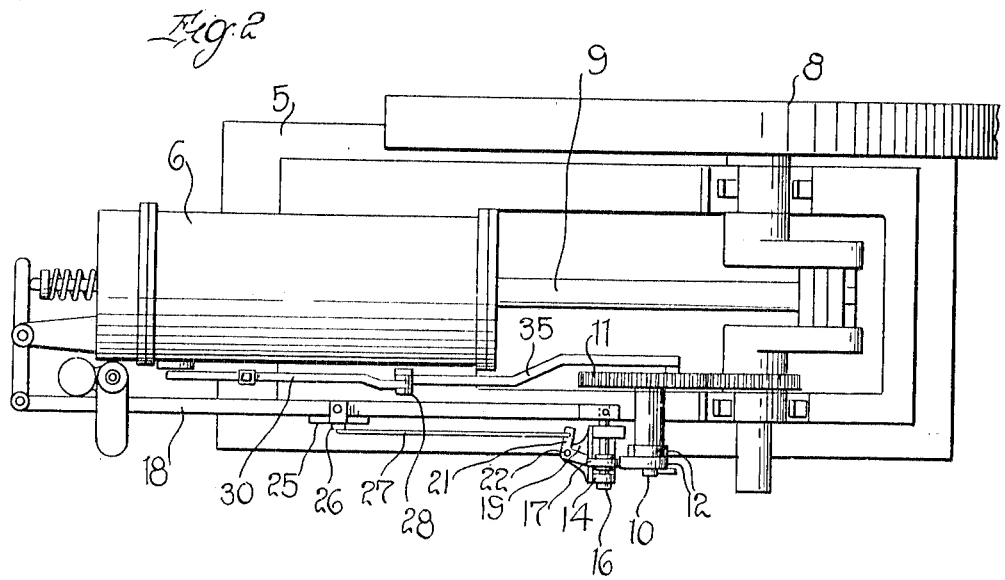
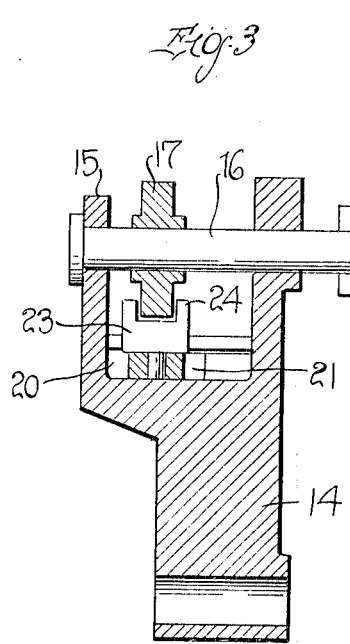
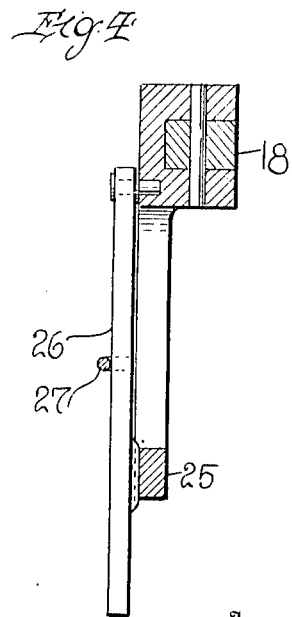
Inventor
C. S. CLARK.
Witnesses
Robert M. Sutphen
A. L. Hunt
By Watson E. Coleman
Attorney

UNITED STATES PATENT OFFICE.

CLIFFORD S. CLARK, OF MEADOWVIEW, VIRGINIA.

REVERSING-GEAR FOR ENGINES.

1,117,325.  Specification of Letters Patent.  Patented Nov. 17, 1914.

Application filed April 1, 1914. Serial No. 828,847.

*To all whom it may concern:*

Be it known that I, CLIFFORD S. CLARK, a citizen of the United States, residing at Meadowview, in the county of Washington and State of Virginia, have invented certain new and useful Improvements in Reversing-Gears for Engines, of which the following is a specification, reference being had to the accompanying drawings.

This invention relates to an improved reversing gear for gas engines and has for its primary object to provide a very simple arrangement of coöperating elements whereby the operation of the engine may be easily and quickly reversed.

The invention has for a further object to provide an improved mounting for the igniter rod and actuating means therefor whereby the movable electrode of the igniter is operated at the proper time to create the necessary spark and explode the gaseous charge.

My invention has for a further object to provide a reversing mechanism for engines which is positive and reliable in its operation, strong and durable in construction and will not subject the parts of the engine to excessive strain upon the reversal of their operation.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1:
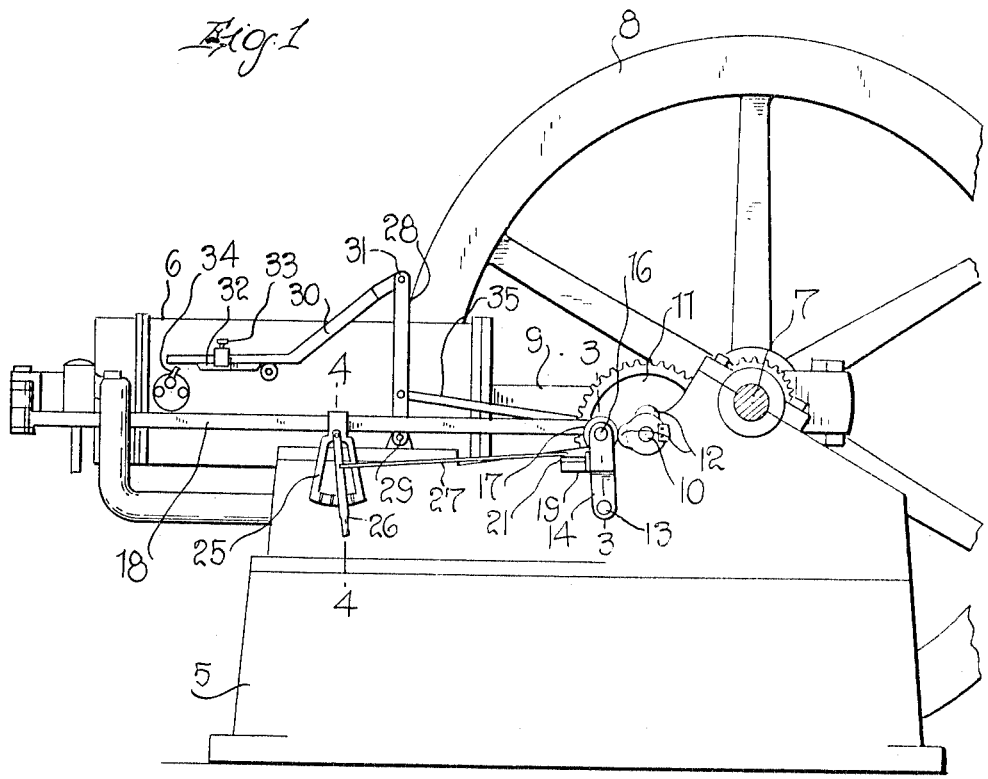
Figure 5:
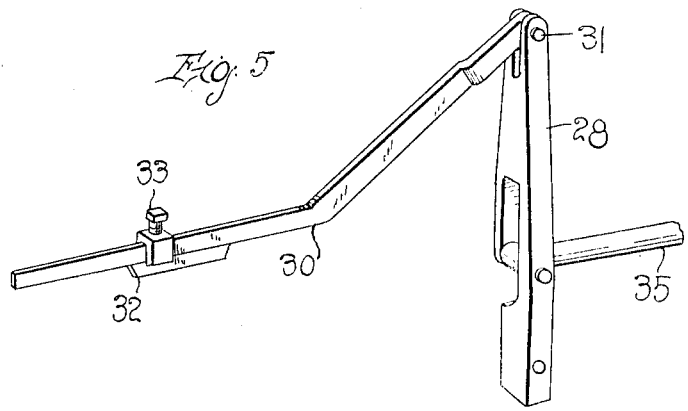

Figure 1 is a side elevation of a gas engine provided with my improved reversing gear; Fig. 2 is a top plan view; Fig. 3 is a section taken on the line 3—3 of Fig. 1; Fig. 4 is a section taken on the line 4—4 of Fig. 1; Fig. 5 is a perspective view of the igniter rod and the pivoted upright in which the same is mounted.

Referring in detail to the drawings, 5 indicates a base upon which the engine cylinder 6 is mounted, and 7 designates the usual fly crank shaft, provided with the wheel 8. The piston rod 9 is connected to the crank of said shaft in the ordinary manner.

A shaft 10 is mounted upon the engine base 5 in parallel relation to the crank shaft and upon one end of said shaft 10, the gear wheel 11 is fixed, said gear meshing with a gear secured upon the crank shaft. Upon the shaft 10, a pair of cam disks 12 are keyed, the eccentric portions of said cam disks extending in planes at right angles to each other. Upon a stud pin 13 projecting from the engine base, a rocker arm 14 is mounted. The upper end of this arm is forked or bifurcated as at 15 and in the spaced portions thereof, the ends of a stationary rod or pin 16 are mounted. Upon this pin, the wheel 17 is loosely arranged for engagement by the cams 12.

18 designates the spring pressed exhaust valve rod which is connected to one end of the rod or shaft 16. Upon the rocker arm 14, a bracket 19 is secured, said bracket being provided with a slot 20. Through this slot, one arm of a bell crank lever 21 projects, said lever being fulcrumed upon the bracket as at 22. This longer arm of the lever which extends through the slot 20 has a member 23 pivotally mounted thereon, said member being provided with spaced arms 24 extending upwardly contiguous to the opposite faces of the wheel 17.

A rack 25 is rigidly fixed upon the valve rod 18 and upon said rack a lever 26 is fulcrumed at one of its ends. This lever is provided with a spring pressed dog for engagement with the teeth of the rack and to a point intermediate of its ends, one end of the connecting rod 27 is loosely attached, the other end of said rod being similarly connected to the shorter arm of the bell crank lever 21. It will be understood that by means of this arrangement of parts, by simply shifting the lever 26, the wheel 17 may be moved longitudinally upon the rod 16 mounted in the upper end of the rocker arm so that the same will be engaged by one or the other of the cams 12, and the time of movement of the exhaust valve rod with respect to the movement of the engine piston in its cylinder varied in order that the reciprocation of said piston may be reversed.

An upright member 28 is fulcrumed at its lower end upon the stud bolt 29 fixed in the base 5 of the engine. The igniter rod indicated at 30 is pivotally connected by means of the pin 31 to the upper end of said upright. 32 designates a trip member which is longitudinally adjustable upon this igniter rod and is adapted to be secured in its adjusted position by means of the set screw 33. This trip member engages the finger indicated at 34 on the movable electrode of the igniter in the usual manner to engage a contact carried by said member with the stationary contact and close the circuit whereby the electric spark is created for the explosion of the gaseous charge when the contact is broken. Adjacent the lower end of the upright 28, a rod 35 is pivotally connected thereto, the other end of said rod being engaged upon the eccentric pin which is fixed to the gear wheel 11 on the cam shaft 10.

In applying my improved reversing gear to the ordinary gas engine, the parts are arranged and connected in the manner above explained, when the piston is at the outer end of its stroke, the crank shaft and the eccentric stud to which the igniter bar actuating rod is connected, are at the outermost point of their movement. It will thus be manifest that in the operation of the engine, when the wheel or roller 17 is engaged by one of the cam disks 12, the exhaust will be opened in the movement of the piston in one direction to exhaust the burnt gases, and in the rotation of the gear wheel 11, the igniter is operated at the proper time by the rod 30 to explode the subsequent gaseous charge which has been compressed in the forward movement of the piston. When it is desired to reverse the operation of the engine, the operator shifts the lever 26, and moves the wheel 17 into position to be engaged by the other of the cams 12. The eccentric portion of which as above stated projects in a plane at right angles to that of the adjacent cam. Thus there will be a difference of ninety degrees in the time of operation of the exhaust valve rod with respect to the movement of the engine piston. By providing the pivoted upright member 28, the movement of the igniter operating bar is accelerated, or in other words, the igniter is operated and the gas exploded, and the explosion occurs at the proper time, either in the forward or reverse operating movement of the engine piston. It is, of course, understood that the trip member 32 is properly adjusted so as to advance the spark and ignite the gas somewhat before the piston reaches a dead center.

From the foregoing description taken in connection with the accompanying drawings, it is believed that the construction, manner of operation and several advantages of my improved engine reversing gear will be clearly understood. The device may be applied to any of the several types of gasolene engines without necessitating any material alterations in their construction and is very positive and reliable in practical operation. By means of the invention, the operator may easily and quickly reverse the operation of the engine by simply shifting the lever 26, and such reversal takes place without subjecting the parts of the engine to undue shock or jar which might occasion serious injury thereto. Owing to the extremely simple form of the several elements employed, it will be appreciated that the device can be produced at small manufacturing cost.

While I have shown and described the preferred construction and arrangement of the several parts, it is obvious that the invention is susceptible of considerable modification therein and I therefore reserve the privilege of resorting to all such legitimate changes as may be fairly embodied within the spirit and scope of the appended claims.

Having thus described the invention, what is claimed is:

1. The combination with an engine provided with an exhaust valve rod, of a shaft geared to the engine shaft, a pair of cam disks fixed upon said shaft and having their eccentric portions disposed at an angle with respect to each other, a rocker arm mounted upon the engine base, one end of said valve rod being connected to said arm, a shiftable element mounted in said arm for engagement with the respective cam disks, and means mounted upon the valve rod and connected to said element to shift said member out of engagement with one cam and into engagement with the other cam whereby the operation of the engine may be reversed.

2. The combination with an engine provided with an exhaust valve rod, of a shaft geared to the engine shaft, a pair of cam disks fixed upon said shaft and having their eccentric portions disposed at an angle with respect to each other, a rocker arm mounted upon the engine base, a rod carried by said arm, said valve rod being connected to one end of said latter rod, a roller loosely mounted upon said rod for engagement with said cams, a bell crank lever mounted upon the arm and provided with means to shift the roller longitudinally upon the rod, and manually operable means connected to the bell crank lever to shift said roller out of engagement with one of the cams and into engagement with the other cam whereby the operation of the engine may be reversed.

3. The combination with an engine provided with an exhaust valve rod, of a shaft geared to the engine shaft, a pair of cam disks fixed upon said shaft and having their eccentric portions disposed at an angle with respect to each other, a rocker arm mounted upon the engine base, a rod carried by said rocker arm, said valve rod being connected to one end of said latter rod, a roller loosely mounted upon said rod for engagement with said cams, a bell crank lever fulcrumed upon said arm, a member pivotally mounted upon one arm of the bell crank lever and engaging said roller to shift the same, a lever mounted upon the valve rod and movable therewith, and a connecting rod between said lever and the other arm of the bell crank to actuate the latter and shift said roller out of engagemnt with one of the cams and into engagement with the other cam whereby the operation of the engine may be reversed.

4. The combination with an engine provided with an exhaust valve rod, of a shaft geared to the engine shaft, a pair of cam disks fixed upon said shaft and having their eccentric portions disposed at an angle with respect to each other, a rocker arm mounted upon the engine base, a rod mounted in said rocker arm and connected at one of its ends to said exhaust rod, a roller loosely mounted upon said rod, a bracket secured upon said arm, a bell crank lever fulcrumed upon said bracket, a member pivoted upon one arm of said lever to engage said roller and shift the same longitudinally on the rod, a rack fixed to the exhaust valve rod, a lever fulcrumed thereon, and a connecting rod between said lever and the other arm of the bell crank to actuate the latter and shift said roller out of engagement with one cam and into engagement with the other cam whereby the operation of the engine may be reversed.

5. The combination with a gas engine provided with an igniter, of a gear driven from the engine shaft, an upright fulcrumed at its lower end upon the engine base, an igniter rod pivotally connected to the upper end of said upright, an adjustable trip member mounted upon said rod to engage and actuate the movable electrode of the igniter, and a rod pivotally connected at one of its ends to said upright adjacent the fulcrum thereof and eccentrically connected at its other end to said gear.

In testimony whereof I hereunto affix my signature in the presence of two witnesses.

CLIFFORD S. CLARK.

Witnesses:
  Bascom D. Akers,
  A. W. Aston.

Copies of this patent may be obtained for five cents each, by addressing the "Commissioner of Patents, Washington, D. C."